United States Patent Office 3,242,126
Patented Mar. 22, 1966

3,242,126
POLYURETHANE SYNTHESIZED FROM POLYISO-
CYANATES AND POLYESTERS OF POLYOLS
AND COAL ACIDS
Herbert B. Rickert, Knoxville, Tenn., assignor to The
Dow Chemical Company, Midland, Mich., a corporation of Delaware
No Drawing. Filed Sept. 29, 1964, Ser. No. 400,254
7 Claims. (Cl. 260—31.2)

This application is a continuation-in-part of my earlier co-pending application, Serial No. 182,676 from March 26, 1962, now abandoned.

Resinous polyurethane products are formed, among other known ways, in the reaction that occurs between polyesters containing terminal hydroxyl groups and polyisocyanates. Such a reaction may be represented as follows:

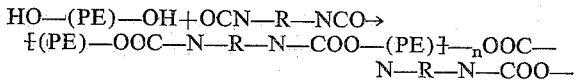

wherein the symbol (PE) represents the nucleus of the polyfunctional polyester; R is the organic nucleus of the polyisocyanate and $n$ is a plural whole integer. If the polyester contains more than two terminal hydroxyl groups, a three dimensional or cross-linked polymer product may be obtained. This may also be the case when more than a difunctional polyisocyanate is employed.

Besides other uses, many of the resinous polyurethanes, particularly those having a cross-linked polymeric structure, furnish an excellent base for surface coatings that form hard, fast-drying, solvent resistant and scuff-proof films or protective coated layers. Many polyurethanes, however, are relatively expensive materials.

The chief aim and concern of the present invention is to provide, on a more economical basis, new and useful polyurethanes derived from polyisocyanates and polyfunctional polyesters that are especially adapted for application and utilization in surface coatings having properties and characteristics that are at least commensurate, if not superior, to known analogous materials.

The resinous polyurethanes of the present invention are comprised of the cross-linked products of reaction between polyisocyanates and polyesters containing more than two terminal hydroxyl groups which are the condensates of polyhydroxy compounds and the polycarboxylic organic acid mixtures that are obtained from the oxidation of coal and the like carbonaceous materials, hereinafter referred to as coal acids. The polyurethanes may be conveniently prepared or obtained by or upon the mere admixing or intimate combination of the polyisocyanate with the polyfunctional polyester, suitably in a mutual solvent or dispersing medium. The solvent that is employed for such formational purpose may advantageously be selected as one that is capable of simultaneous function as a vehicle for the reaction product in varnish-like surface coating compositions. These compositions containing the resinous polyurethane in liquid dispersion may be coated on various surfaces to form excellent protective films that are generally hard, tough and exceptionally resistant to marring and the action of solvents. Upon the incorporation of pigments and fillers in the varnish-like polyurethane compositions, very satisfactory paints are provided.

The polyfunctional, plural terminal hydroxy group-containing polyesters that are employed in the practice of the invention may be obtained by reacting free coal acids with glycols or polyalkylene glycols until complete or substantially complete esterification has occurred. Ordinarily, in such a reaction, a cross-linked polyester is obtained that contains at least two free terminal hydroxyl groups capable of entering into further reaction. More often, the polyester obtained is advantageously found to have an average of three or more free reactive terminal groups. The glycols or polyalkylene glycols that are employed may be of the structure: HO—G—OH, wherein G is an alkylene radical or a bivalent radical derived from a polyalkylene glycol. Advantageously, the radical G may contain two or more, preferably from two to ten, carbon atoms and, when derived from polyglycol substances, may also contain ether linkages, or hetero oxygen atoms, in its structure. Of course, mixtures of various glycols and polyglycols may be employed to prepare the polyfunctional polyesters.

The polyesters may be formed by dissolving or otherwise dispersing (as by suspending) the free coal acids and the desired glycol or polyglycol in a suitable non-aqueous solvent, such as xylene, methyl isobutyl ketone, methyl amyl ketone and the like or equivalent solvents, and refluxing the reaction mass while removing the water of condensation until the desired product has been formed. If desired, an acid catalyst, such as sulfuric acid or its equivalents for such purposes (including sulfonated polystyrene resins in free acid form) and the like, may be optionally employed to facilitate the reaction. The catalyst may be used in the minor proportions that are conventional for esterification reactions. Temperatures between about 100° and 150° C. may be employed suitably for the reaction under atmospheric pressure, although other temperatures may also be found operable and either subatmospheric or superatmospheric pressures may be utilized. When a catalyst is employed, the reaction proceeds at a moderate rate at the lower end of the indicated temperature range and at a much faster rate at the higher end thereof. By way of illustration, in catalyzed reactions that are conducted at 110–120° C., the esterification is ordinarily found to be 50–60 percent complete in time periods of 3 to 6 hours. At 130–140°, 90 percent conversions are usually experienced within an hour. Without a catalyst, a somewhat slower reaction may be experienced. Thus, uncatalyzed reactions at 110–120° C. may be only about 40 percent converted after 3 to 6 hours, although higher temperatures are found to improve the rates.

It is ordinarily desirable to employ an amount of the glycol or polyglycol in the reaction mass that is in excess of the amount of free coal acids to be esterified. This ensures obtaining a substantially completely esterified polyester containing a plurality of terminal hydroxyl groups in its structure. Generally, from about 1.1 to 2 equivalent weights of the glycol or polyglycol to each equivalent weight of the free coal acids in the reaction mass are advantageous to utilize for this purpose. The polyfunctional polyesters that are formed may be found to be insoluble in the reaction mass (depending somewhat on the particular polyglycol used in the reaction), especially when relatively non-polar solvents are utilized as the vehicle therefor. In such cases the reaction mass is generally found to occur in two phases upon the termination of or even during the reaction. The polyester, which frequently gravitates to the lower phase, may readily be recovered and isolated by separating the phases of the reaction mass and stripping the polyester-containing phase in vacuo at a modestly elevated temperature, say about 40–50° C., for a prolonged period of time, say overnight.

The coal acids that are employed to prepare the relatively inexpensive polyfunctional polyesters in the practice of the invention may be identical with or similar to those which may be obtained by the oxidation with gaseous oxygen, which may be contained in the air, of an aqueous alkaline slurry of a finely divided carbonaceous material selected from the group consisting of coal and coke that has been obtained by the carbonization of coal at a temperature ranging beneath about 700° C. Coal acids that have been obtained by the nitric acid oxidation of suitable carbonaceous materials are also generally satisfactory as are equivalent synthetic mixtures which may be provided. Such coals that are of the varieties known as anthracite, bituminous, subbituminous and lignite and other low grade coals are generally suitable for production of coal acids. Satisfactory cokes are those produced according to conventional techniques from coal at a temperature beneath about 700° C. The utilization of higher coking temperatures frequently causes the cokes that are obtained to be graphitic and rendered unsuitable for conversion to coal acids in satisfactory yields.

The free coal acid product is a hydroscopic, usually yellowish, essentially water soluble material. It is believed to be substantially comprised of various aromatic polycarboxylic acids. The average molecular weight of the coal acids that are ordinarily obtained (as indicated, for example, by means of boiling point elevations) is frequently in the neighborhood of 250–270 or so; seldom being less than 200 or more than 300. Their average equivalent weight is generally about 80; usually being more than 70 and rarely more than 90. They ordinarily appear to have an average of 2.5 to 5 carboxylic groups per molecule with an apparent average of about 3 to 4 being common. While their exact chemical nature and constitution may be somewhat conjectural, they evidently contain considerable quantities of tri- and tetra-carboxylic benzene acids as well as aromatic acids having more complex nuclei. Frequently for example, the greatly preponderant proportion of aromatic nuclei obtained in coal acids prepared in the described fashion have been found to consist of methylnaphthalene, benzene, biphenyl, naphthalene, phenanthrene, alkyl benzene, benzophenone and toluene nuclei. As might be expected, the free coal acids are a chemical commodity which, besides other of their desirable features and aptitudes, have the general attractiveness of low cost in their favor.

Any polyisocyanate conforming to the general structure: $X(NCO)_z$, wherein X is a polyvalent organic nucleus or an organic group having a plurality of isocyanate substituents and z is an integer from 2 to 3. Advantageously, triisocyanates are utilized that have a molecular weight between about 600 and 1800. Thus, with such species of polyisocyanates, the numerical value of z in the indicated formula is three. As described by Heiss et al. at page 1498 of the July 1954 issue of Industrial & Engineering Chemistry, such varieties of relatively high molecular weight trifunctional isocyanates may be prepared from aliphatic polyols and aromatic diisocyanates. Trifunctional isocyanates are available, which are typical of the preferred varieties of polyisocyanates that may be utilized in the practice of the present invention. Thus, a suitable isocyanate hereinafter designated A may be obtained in the form of an ethyl acetate solution that contains about 14.2 percent by weight, based on the total weight of solution, of isocyanate (NCO) groups and about 75 percent by weight of solids comprised of a trifunctional isocyanate having a molecular weight of about 666 (which actually may be found to vary from say, about 640 to 680, depending upon the method of determination) and an equivalent weight of about 222. As it is obtained in solution form, isocyanate A has an NCO equivalent weight of about 296. A second suitable isocyanate hereinafter referred to as isocyanate B is the condensation product of 3 moles of toluene diisocyanate and 1 mole of trimethylol propane and contains about 3 percent free toluene diisocyanate. Isocyanate B is generally available as a solution of about 60 percent by weight of solids in a solvent consisting of equal parts by volume of toluene and ethyl acetate and containing about 7.8 percent by weight of isocyanate groups, based on the weight of the solution. Isocyanate B has an NCO equivalent weight of about 538 as it is obtained in solution. The trifunctional isocyanate in isocyanate B has a molecular weight of about 969 (which, within experimental error, may be found to vary from a lower value to one as high as about 1200) and an NCO equivalent weight of about 323. The infrared spectrum of both isocyanate A and isocyanate B indicates the presence in the compositions of aromatic rings, free N—H units, ester carbonyl and some aliphatic carbon.

The optimum quantity of the polyisocyanate that may be used for the formation of the polyurethane depends to a great extent upon the number of terminal hydroxyl groups that are available in the polyester. This in turn depends in large measure upon the particular characteristics of the free coal acids that were employed in the polyester formation and the degree of polymerization accomplished therein. It is, of course, desirable to employ a sufficient quantity of the polyisocyanate to utilize all the available functional hydroxyl groups that are present in the polyester. In this connection, the relatively high functionality of the coal acids and the polyesters prepared therefrom permits suitable polyurethanes to be formed in the practice of the invention with smaller quantities of polyisocyanate being required than when the conventional polyfunctional polyester compounds known to the art are involved. Greater relative amounts of the polyisocyanate facilitates more extensive crosslinking in the polyurethane and results in quicker-drying surface coatings. Ordinarily, an amount of the polyisocyanate that is between about 10 and 100 percent by weight of the polyester, based on the weight of the latter, may be suitably employed. Frequently, it may be most suitable to employ from 40 to 60 percent by weight of the polyisocyanate in the preparation of the resinous polyurethane products.

Any relatively volatile mutual solvent for the polyurethane and the polyester may be employed as the vehicle in which the polyurethane is formed and to provide the base for the varnish-like surface coatings obtainable therewith. Methyl ethyl ketone, ethyl acetate, mixtures of toluene and ethyl acetate and the like may be used with particular advantage in various instances for this purpose. In this connection, it is usually beneficial for the solvent that is employed to have a relatively pronounced degree of polarity as may be provided by a single constituent or in a mixed solvent system. Generally the polyurethane can be satisfactorily formed with the reactants, and a suitable surface coating simultaneously provided, when between about 50 and 75 percent or so by weight of total solids are incorporated in the particular solvent, based on the weight of the total composition. When paint-like coatings are desired, conventional quantities of pigments, fillers, extenders and the like can be incorporated in the varnish-like compositions. Obviously, if it is so desired, the polyurethane can be separated as a solid from the solvent in which it is formed for any use that may be intended.

The invention is further illustrated by the following examples wherein unless otherwise indicated, all parts and percentages are to be taken by weight.

*Example 1*

About 166 g. of free coal acids (approximately 2 equivalent weights), 266 g. of triethylene glycol and 400 g. of toluene were heated together at reflux in the presence of 10 ml. of 20 percent aqueous sulfuric acid for 3¾ hours. During this time about 29 ml. of water were stripped from the reaction mass. After termination of the reaction, the reaction mass was cooled, whereupon it separated into two phases. The lower phase was isolated and stripped of residual toluene by being placed overnight in a vacuum oven at 45° C. A polyester intermediate was thereby obtained. About 5 g. of the polyester intermediate and 3 g. of isocyanate B, the condensation product of 3 moles of toluene diisocyanate and one mole of trimethylol propane and containing 3 percent free toluene diisocyanate were dissolved in 10 g. of methyl ethyl ketone. The resulting composition was a varnish-like material. When brushed on a block of wood it dried to give a hard, tough film. A similar formulation was blended with 1.5 g. of fast benzidine yellow dyestuff and 2.5 g. of titanium dioxide pigment. A good, fast-drying yellow-paint-like composition was obtained.

*Example II*

The procedure of Example I was essentially repeated with 83 g. (1 equivalent weight) of the free coal acids, 113 g. of triethylene glycol, 200 g. toluene and 5 ml. of the aqueous acid solution. The polyester intermediate was recovered in good yield after refluxing the reaction mass for 5 hours at 108–112° C. A varnish-like composition was prepared by dissolving about 35 g. of the polyester intermediate with 21 g. of isocyanate B in 84 g. of methyl ethyl ketone. It provided excellent tough, hard, quick-drying protective coatings when brushed on wooden surfaces. When a similar varnish-like composition was prepared using only about 20 percent of polyisocyanate on the polyester, a relatively sticky and slow drying coating composition was obtained.

The following paint-like formulations were prepared with the above polyurethane composition dissolved in methyl ethyl ketone:

RED PAINT

|  | G. |
|---|---|
| Polyurethane composition | 40 |
| Red toner | 4 |
| Titanium dioxide | 4 |

GREEN PAINT

| Polyurethane composition | 40 |
|---|---|
| Monastral blue | 1 |
| Fast benzidine yellow | 2 |
| Titanium dioxide | 5 |

YELLOW PAINT

| Polyurethane composition | 40 |
|---|---|
| Fast benzidine yellow | 1 |
| Titanium dioxide | 5 |

Each of the paint-like products were ball milled with BB shot for about an hour after their initial formulation. The milled product was then brushed on plywood blocks and permitted to dry. The formulations had good brushing and self-leveling characteristics. They each dried in an hour to produce well colored surfaces that remained undiscolored in the six months after their application.

Results similar to the foregoing were obtained when the indicated procedures were substantially duplicated employing polyisocyanates that were formed with polyesters prepared with ethylene glycol and diethylene glycol using varying equivalent weight ratios of the glycol compounds to the coal acids between about 1.5 and 2 to 1, respectively.

*Example III*

A polyester intermediate was prepared from propylene glycol and free coal acids having an average molecular weight of about 284, an average apparent equivalent weight of about 84.6, an average functionality (or number of carboxylic groups per molecule) of about 3.36 and a carbon-to-hydrogen ratio of about 1.46; being comprised of about 54.36 percent of carbon; 3.10 percent of hydrogen; 0.52 percent nitrogen and 0.16 percent sulphur. The apparatus assembly that was employed for the synthesis consisted of a standard 4-neck resin flask equipped with an efficient stirring mechanism, a water take-off, a nitrogen sparger and a thermowell. About 1.3 gram equivalents of the coal acids and 2.0 gram equivalents of the propylene glycol were charged to the flask along with about 100 milliliters of xylene as a solvent medium. The charged mixture of reactants was cooked for about 2¼ hours at 125–140° C., during which time about 20 milliliters of water were stripped from the reaction mass. After this about 79 milliliters of xylene were stripped from the polyester intermediate and subsequently replaced with about 44 milliliters of the dimethyl ether of diethylene glycol. About a 70 percent solids content resin solution of the polyester intermediate was thereby obtained. The solution of the polyester intermediate had a Gardner viscosity of A2–A3 and an hydroxyl (OH) equivalent weight of about 197.

About 50 grams (261 milliequivalents) of the solution of the resinous polyester intermediate was mixed with 21 grams (39 milliequivalents) of isocyanate B. A homogenous solution of polyurethane product was obtained in which the ratio of polyester equivalents to polyisocyanate equivalents was about 6.69:1. When applied as a coating over a glass plate, the polyisocyanate solution dried within 20 minutes to a tough, hard, tightly-adhering film having a thickness of about 2 mils.

*Example IV*

Using the general procedure of the third example, a polyester intermediate was prepared from 1,3-butylene glycol and coal acids. The polyester intermediate was dissolved in a solvent mixture of about one part by volume of xylene to 2 parts by volume of methyl ethyl ketone to give a 50 percent solution of the resinous intermediate in the solvent mixture. About 10 grams (14.4 milliequivalents) of the polyester intermediate solution which had an OH equivalent weight of about 649 was mixed with 7 grams (23.7 milliequivalents) of isocyanate A to produce a homogenous solution (containing a polyurethane with a polyester to polyisocyanate equivalent weight ratio of about 0.61:1) which was subsequently applied as a coating over a glass plate. Within about 2 minutes a tough, hard tack-free film of 3 mils in thickness was formed on the plate.

*Example V*

Following the general procedure of Example III, a polyester intermediate was prepared from diethylene glycol and coal acids. About 5 grams of the polyester intermediate was mixed with about 2 grams of methyl ethyl ketone to provide a solution with an OH equivalent weight of about 340. All of the intermediate polyester solution (20.6 milliequivalents) was mixed with about 4 grams of isocyanate A (13.5 milliequivalents) to form a homogenous solution of polyurethane resin having a polyester to polyisocyanate equivalent ratio of about 1.53:1. When applied as a coating over a glass plate the product solution dried in 5 minutes to a tough, hard 2 mil film that adhered tightly to the smooth substrate.

Excellent results may also be obtained when other polyisocyanates are employed with polyesters prepared from coal acids and other glycols and polyglycols within the scope of the invention.

What is claimed is:

1. A resinous polyurethane that is comprised of the cross-linked product of reaction between (1) an organic polyisocyanate of the formula: $X(NCO)_z$, wherein X is a polyvalent organic aromatic nucleus having a valence of z and z is a plural integer from 2 to 3 and (2) a polyester containing more than two functional terminal hydroxyl groups, said polyester being the condensate of (a) a polyhydroxy compound of the formula:

HO—G—OH wherein G is a bivalent radical selected from the group consisting of an alkylene radical that contains from 2 to 10 carbon atoms and a bivalent radical from a polyalkylene glycol obtained by removing both terminal, oxygen-connected hydrogen molecules therefrom that contains from 2 to 10 carbon atoms and (b) coal acids that are the product of the oxidation of coal, which acids have an average molecular weight of from 200 to 300, an apparent average equivalent weight of from 70 to 90, and contain an average of from 2.5 to 5 carboxylic groups per aromatic nucleus in their molecule.

2. A resinous polyurethane that is comprised of the cross linked product of a reaction between (1) an organic polyisocyanate which is a condensation product of about 3 moles of toluene diisocyanate and 1 mole of trimethylol propane containing about 3 percent free toluene diisocyanate and (2) a polyester containing more than two functional terminal hydroxyl groups, said polyester being the condensate of (a) a polyhydroxy compound of the formula: HO—G—OH, wherein G is a bivalent radical selected from the group consisting of an alkylene radical that contains from 2 to 10 carbon atoms and a bivalent radical from a polyalkylene glycol obtained by removing both terminal, oxygen-connected hydrogen molecules therefrom that contains from 2 to 10 carbon atoms and (b) coal acids that are the products of the oxidation of coal, which acids have an average molecular weight of from 200 to 300, an apparent average equivalent weight of from 70 to 90, and contain an average of from 2.5 to 5 carboxylic groups per aromatic nucleus in their molecule.

3. The polyurethane of claim 2, wherein the polyhydroxy compound is triethylene glycol.

4. The polyurethane of claim 2, wherein the polyisocyanate is a triisocyanate having a molecular weight between about 600 and 1800.

5. The polyurethane of claim 2, comprised of the reaction product of between about 0.1 and 1 part by weight of the polyisocyanate for each part by weight of the polyester.

6. The polyurethane of claim 2, comprised of the reaction product of between about 0.4 and 0.6 part by weight of the polyisocyanate for each part by weight of the polyester.

7. A protective coating composition comprised of the resinous polyurethane of claim 2 in an amount between about 50 and 75 percent by weight of the composition, in a volatile solvent vehicle therefor selected from the group consisting of methyl ethyl ketone, ethyl acetate, xylene, and mixtures of toluene and ethyl acetate.

References Cited by the Examiner
UNITED STATES PATENTS 2,895,935    7/1959    Archer et al. _____ 260—40
3,015,650    1/1962    Schollenberger _____ 260—32.8

MORRIS LIEBMAN, *Primary Examiner.*